United States Patent [19]

Takeda

[11] Patent Number: 5,670,832
[45] Date of Patent: Sep. 23, 1997

[54] POWER-SUPPLY CONTROL APPARATUS FOR IMAGE PROCESSING APPARATUS

[75] Inventor: Hiroaki Takeda, Kawasaki, Japan

[73] Assignee: Canon Kabushiki Kaisha, Tokyo, Japan

[21] Appl. No.: 347,170

[22] Filed: Nov. 22, 1994

Related U.S. Application Data

[63] Continuation of Ser. No. 836,814, Feb. 19, 1992, abandoned.

[30] Foreign Application Priority Data

Feb. 28, 1991 [JP] Japan .................. 3-034052

[51] Int. Cl.$^6$ .................. G03G 21/00; H01H 43/00
[52] U.S. Cl. .................. 307/39; 399/37
[58] Field of Search .................. 307/29, 43, 38, 307/39, 142, 140–141.8; 361/194; 355/206, 208, 204, 205; 371/16.3, 14, 62; 364/525, 707, 273.1–273.5, 493; 455/343; 365/227; 395/790, 182.12, 182.2; 399/37, 88, 89

[56] References Cited

U.S. PATENT DOCUMENTS

| | | | |
|---|---|---|---|
| 3,669,412 | 6/1972 | Oawa | 355/309 |
| 4,243,313 | 1/1981 | Masuda et al. | 355/206 |
| 4,467,246 | 8/1984 | Tanaka et al. | 315/158 |
| 4,468,715 | 8/1984 | Reno, Jr. | 361/194 |
| 4,480,195 | 10/1984 | Sawaki et al. | 355/208 |
| 4,497,568 | 2/1985 | Komiya et al. | 355/208 |
| 4,538,007 | 8/1985 | Fraden | 307/141 |
| 4,766,404 | 8/1988 | Ishida et al. | 355/218 |
| 4,801,974 | 1/1989 | Soto et al. | 355/208 |
| 4,825,250 | 4/1989 | Miyata et al. | 355/218 |
| 4,870,526 | 9/1989 | Maruta et al. | 355/206 |
| 4,996,625 | 2/1991 | Soma et al. | 307/41 |
| 5,068,853 | 11/1991 | Soma et al. | 371/16.3 |
| 5,432,387 | 7/1995 | Kogure et al. | 307/141 |
| 5,457,516 | 10/1995 | Kim | 355/208 |

FOREIGN PATENT DOCUMENTS

| | | |
|---|---|---|
| 3928567 | 3/1990 | Germany . |
| 58-117562 | 10/1983 | Japan . |
| 2066737 | 7/1981 | United Kingdom . |

*Primary Examiner*—Richard T. Elms
*Attorney, Agent, or Firm*—Fitzpatrick, Cella, Harper & Scinto

[57] ABSTRACT

Disclosed is an image processing apparatus in which, when the apparatus has not been not used for a prescribed period of time, control is performed so as to halt feed of current not only to a display unit and fixing heater but also to other components not required to operate when the apparatus is not in use, and in which on/off control of the power supply also can be performed through a more compact and less expensive arrangement. When a manually operated switch is being pressed by an operator, a transistor is turned on via the contacts of the switch so that power from a smoothing unit is applied to a regulator. The regulator supplies operating power to a microcomputer, which subsequently controls the status of the apparatus power supply depending upon the on/off state of an output port of the microcomputer. Supply of driving power to other components of the apparatus is achieved by opening and closing contacts through control of a relay in response to an output from another output port of the microcomputer.

22 Claims, 4 Drawing Sheets

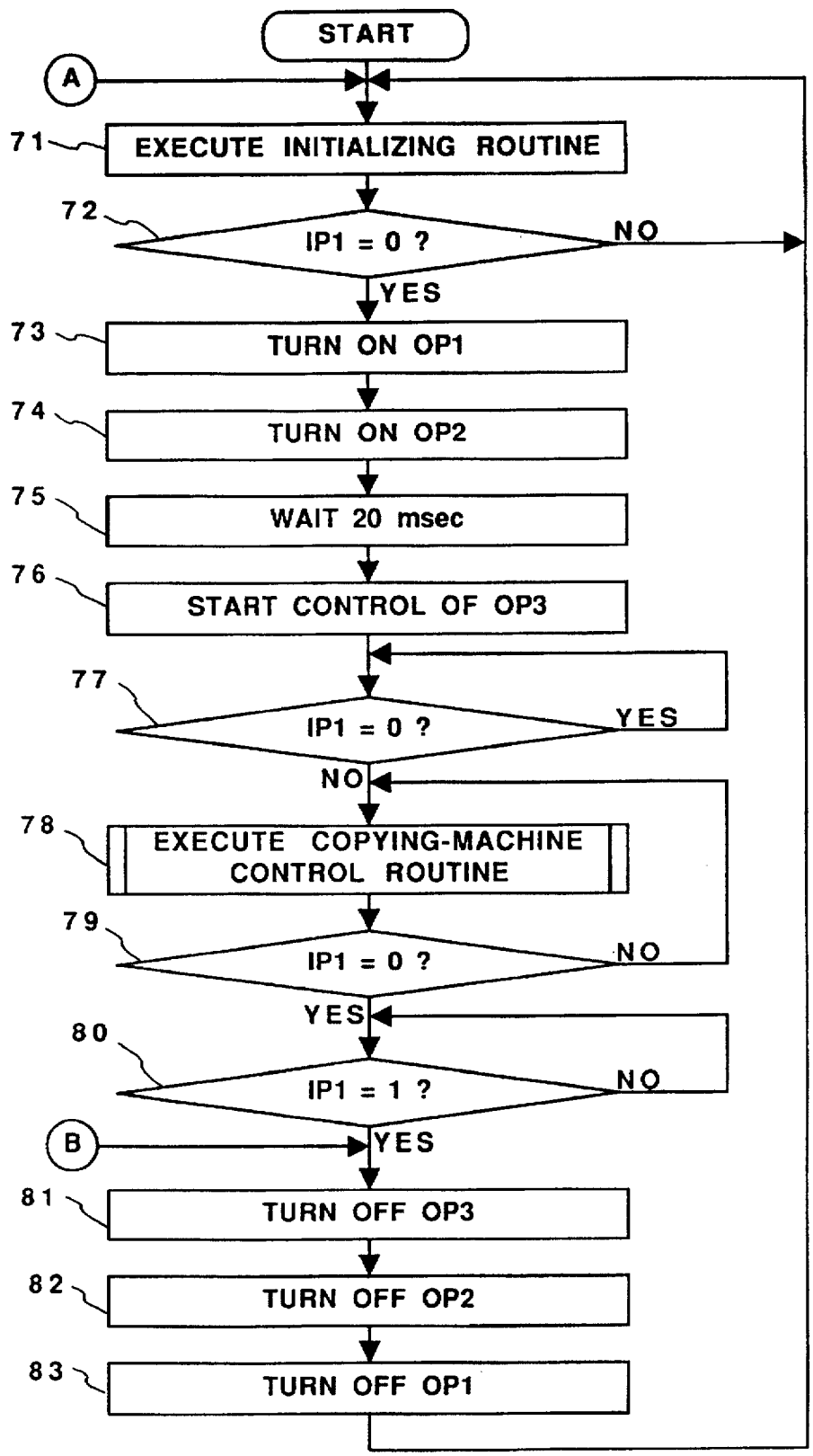
F I G. 2

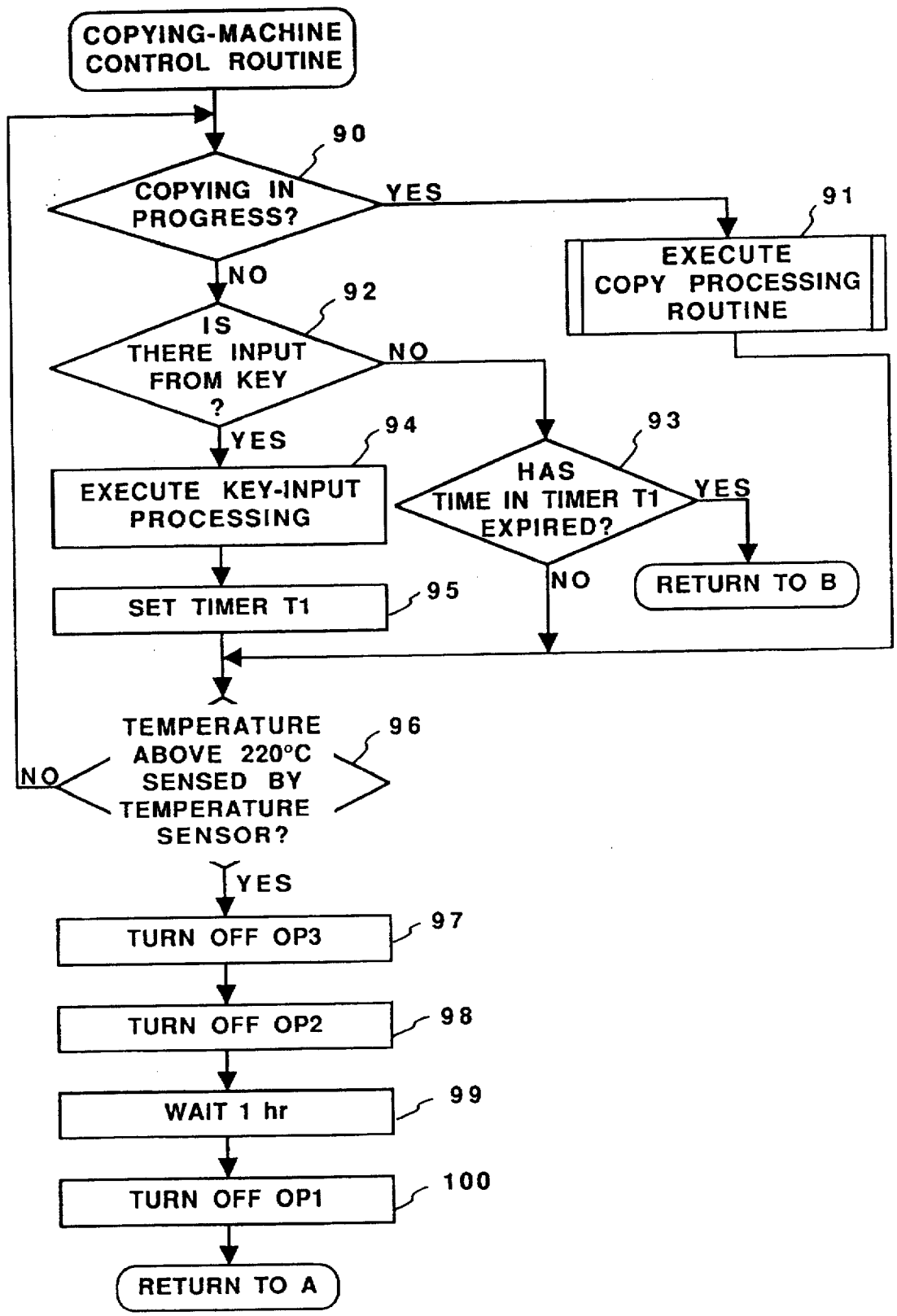
F I G. 3

POWER-SUPPLY CONTROL APPARATUS FOR IMAGE PROCESSING APPARATUS

This application is a continuation of application Ser. No. 07/836,814 filed Feb. 19, 1992, now abandoned.

BACKGROUND OF THE INVENTION

1. Field of the Invention

This invention relates to an image processing apparatus in which the supply of electric power to portions other than an electronic control system is capable of being turned on and off by control performed by the electronic control system.

2. Description of the Prior Art

Various apparatus such as copying machines are provided with an automatic shut-off mechanism for turning off the apparatus automatically in a case where the apparatus is not used for a certain period of time or a case where some abnormality is detected. The purpose of such a mechanism is conserve energy and enhance safety.

As means for controlling the on/off operation of a power supply, these conventional automatic shut-off mechanisms employ a switch of the type in which a solenoid is provided within a see-saw switch, wherein the see-saw switch is opened and closed mechanically depending upon whether the solenoid is energized or not. The switch is such that on/off control is made possible from the apparatus side. At the same time, the switch makes it possible for the user of the apparatus to turn the power supply on and off directly by a manual operation.

The switch in an arrangement of this kind is high in price and makes it difficult to achieve an apparatus which is compact and low in cost. In addition, a switch of this kind possesses a complicated structure and is not satisfactory in terms of reliability and durability.

As other measures for conserving energy in a copying machine, the following mechanisms for the on/off control of a power supply also are employed:

(1) a mechanism in which the feed of current to a fixing heater in the copying machine is halted in a case where the machine has not been used for a prescribed period of time, the reason being that a fixing heater consumes a large amount of power; and (2) a mechanism in which the display on a display/control panel is turned off to reduce power consumption in response to a manual input or when the machine has not been used for a prescribed period of time.

However, in the mechanisms (1) and (2) described above, the only component not supplied with power is the fixing heater or the display on the display/control panel; power continues to be supplied to the other components of the apparatus. Consequently, there is the possibility that the components being supplied with power will malfunction during this time. This is undesirable in terms of safety at the time of a malfunction.

Furthermore, since the display unit is extinguished, the user may fall under the impression that the apparatus power supply has been turned off, in which case the user might forget to actually turn off the power supply. This would lead to unnecessary consumption of power, which is the opposite of the result intended.

SUMMARY OF THE INVENTION

An object of the present invention is to provide an image processing apparatus in which, when the apparatus has not been used for a prescribed period of time, control is performed so as to halt feed of current not only to a display unit and fixing heater but also to other components not required to operate when the apparatus is not in use, and in which on/off control of the power supply also can be performed through a more compact and less expensive arrangement.

According to the present invention, the foregoing object is attained by providing an image processing apparatus which comprises a first power-supply section, which is activated automatically in response to operation of a power-supply switch, for supplying operating power to an electronic control circuit which controls operation of the image processing apparatus at least for a fixed period of time, a second power-supply section for supplying operating power to components other than the electronic control circuit in accordance with control performed by the electronic control circuit, sensing means capable of sensing the operating state of the power-supply switch, and power-supply control means for activating the second power-supply section when the sensing means senses operation of the power-supply switch at such time that the second power-supply section is in an inactive state, and for deactivating the second power-supply section when the sensing means senses operation of the power-supply switch at such time that the second power-supply section is in an active state.

The apparatus of the invention constructed as set forth above eliminates the aforementioned drawbacks of the prior art and makes it possible to reduce the size and cost of the apparatus, enhance its reliability and improve operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a flowchart illustrating control of operation according to this embodiment;

FIG. 3 is a flowchart illustrating the details of control in a copying-machine control routine shown in FIG. 2.

DESCRIPTION OF THE PREFERRED EMBODIMENTS

An embodiment will now be described in detail, with reference to the accompanying drawings, in which the present invention is applied to a copying machine.

Figure 1:
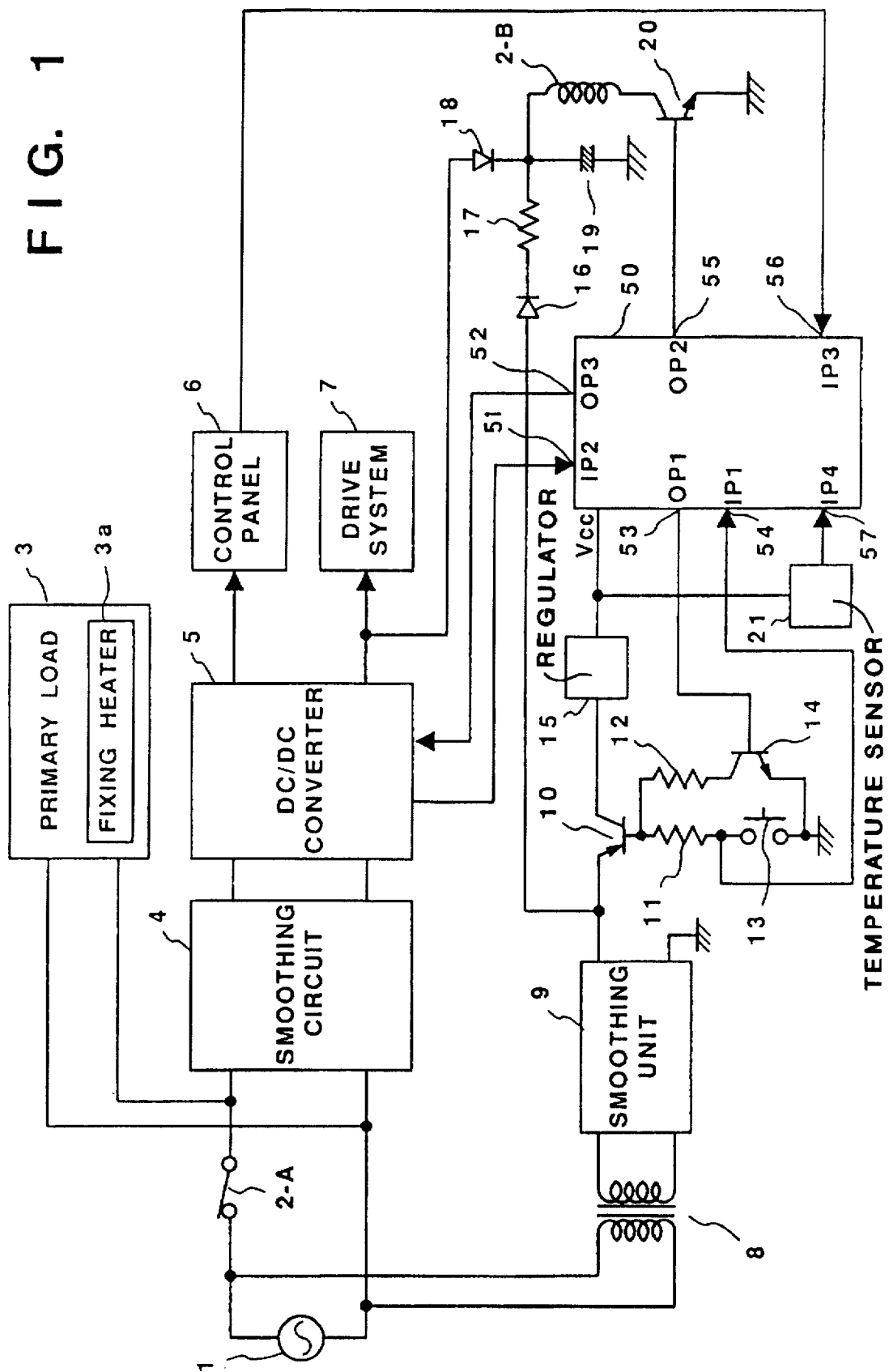
FIG. 1 is a block diagram illustrating an embodiment of an image processing apparatus according to the present invention.

FIG. 1 is a block diagram illustrating an embodiment of the present invention and mainly shows the electronic control circuitry (microcomputer) of a copying machine.

As shown in FIG. 1, an ordinary commercial power supply 1 supplies the apparatus with AC power via a power-supply outlet. A relay which constructs a power-supply switch has a contact side 2-A and a coil side 2-B. The relay is of the normally open type, in which the contact side 2-A is closed by energizing the coil side 2B, whereby power can be supplied to a primary load 3, which includes a fixing heater 3a and the like, and to a smoothing circuit 4. Though FIG. 1 illustrates an example in which a single-contact relay is used, it is possible to adopt an arrangement in which a two-contact relay is used to perform on/off control of both inputs of the AC power supply.

The AC power applied to the smoothing circuit 4 is rectified and smoothed thereby so as to be converted into high-voltage DC power, which is then fed into a DC/DC converter 5. The latter converts the inputted high-voltage DC power into stabilized low-voltage DC power.

The low-voltage DC power stabilized by the DC/DC converter 5 is sent to a control panel 6, which includes a display LED and such input switches as a copy key. Further, the low-voltage DC power stabilized by the DC/DC converter 5 is supplied to a drive system 7, which comprises a motor and solenoid, and to the anode of a diode 18.

A transformer 8 is connected to the commercial power supply 1 and delivers the output of its secondary side to a smoothing unit 9. The latter rectifies and smooths this signal so as to convert it into DC power of a desired voltage. The output of the smoothing unit 9 is connected to the anode of a diode 16 and the emitter of a switching transistor 10.

The base of the switching transistor 10 is connected to a manually operated switch 13 via a resistor 11. The switch 13 is for allowing the user to turn the apparatus power supply on and off. The contacts of this switch are closed while the switch is held depressed by the user.

The side of the manually operated switch 13 connected to the resistor 11 is connected to an input port P1 (54) of a microcomputer 50 constituting the electronic control circuitry which administers overall control of the apparatus in this embodiment. As a result, the microcomputer 50 is capable of reading the operating state of the switch 13.

The base of the switching transistor 10 is connected to the collector of a transistor 14 via a resistor 12. The emitter of the transistor 14 is connected to ground, and the base of the transistor 14 is connected to an output port OP1 (53) of the microcomputer 50.

Further, the collector of the switching transistor 10 is connected to the input of a regulator 15. The latter regulates this input to produce a highly stabilized output of, say, 5 V DC, which is connected to a power-supply input terminal Vcc of the microcomputer 50.

The microcomputer 50 incorporates the control hardware of the DC/DC converter 5. A voltage-detection signal from the DC/DC converter 5 is applied to an input port IP2 (51) of the microcomputer 50. The output from an output port OP3 (52) is controlled (as by PWM control) in dependence upon the inputted voltage-detection signal. The output of the DC/DC converter 5 is controlled so as to be a fixed voltage by the signal from the output port OP3 (52). It should be noted that control for halting the output from the output port OP3 (52) and for delivering the control output can be performed also by starting a program that has been stored in an internal memory of the microcomputer 50.

The cathode of the diode 16 is connected to the cathode of the diode 18, a capacitor 19 and one end of the coil 2B of the relay via a resistor 17. The other terminal of the coil 2-B of relay 2 is connected to the collector of a transistor 20, the base of the transistor 20 is connected to an output port OP2 (55) of the microcomputer 50, and the emitter of the transistor is connected to ground.

The control panel 6 includes manually operated switches, such as the aforementioned copy key. The output of the control panel 6 is inputted to an input port IP3 (56) of the microcomputer 50. The latter is capable of reading in the operating states of the manually operated switches of the control panel 6.

Numeral 21 denotes a temperature sensor which monitors the state of the fixing section. The temperature sensor 21, which is operated by power supplied by the regulator 15, applies its output to an analog input port IP4 (57) of the microcomputer 50. Accordingly, in response to a detection signal from the temperature sensor 21, the microcomputer 50 controls the fixing heater 32 so as to regulate it to a prescribed temperature. The microcomputer 50 is capable also of detecting an abnormality in the fixing heater.

The operation of this embodiment, which is constructed as set forth above, will now be described.

When the copying machine is not operating, as when it is in an initial state (i.e., prior to operation of the manually operated switch 13), the AC power is being supplied to the transformer 8, as a result of which the smoothing unit 9 is delivering the prescribed DC power. The DC power from the smoothing unit 9 is being supplied to the capacitor 19 via the diode 16 and resistor 17, and therefore the capacitor 19 is charged.

Meanwhile, the switching transistor 10 is in the cut-off state and no power is being supplied to the microcomputer 50. Consequently, there is no output at the output port OP2 (55), and the transistor 20 also is in the cut-off state. Accordingly, the coil side 2-B of the relay is not being energized and the contact 2-A of relay is open. The primary load 3 and smoothing circuit 4, etc., are cut off from the commercial power supply 1 and therefore are not being supplied with AC power.

When the manually operated switch 13 is pressed under these conditions, its contacts are closed so that a base current flows into the switching transistor 10 via the resistor 11, thereby turning the switching transistor 10 on so that the regulator 15 is supplied with power from the smoothing unit 9 and the microcomputer 50 is supplied with DC power Vcc (5 V DC in this embodiment). Consequently, the microcomputer 50 is supplied with operating power and starts operating in a manner described in detail later. The microcomputer 50 turns on its output port OP1 (53) to turn on the transistor 14.

When the transistor 14 is turned on, a base current flows into the switching transistor 10 via the resistor 12. Thereafter, even if the contacts of switch 13 are opened, the base of the switching transistor 10 will be supplied with a base current from the side of transistor 14. From this point onward, therefore, the operating power will continue to be supplied to the microcomputer 50 as long as the output port OP1 (53) is not turned off.

After turning on its output port OP1 (53), the microcomputer 50 turns on its output port OP2 (55), thereby turning on the transistor 20. As a result, the coil 2-B of the relay is supplied with power owing to the charge that has been stored in the capacitor 19, and therefore the relay is actuated to close the contacts 2-A. Consequently, upon elapse of the operating time required for closure of the contacts 2-A of the relay, operating power is supplied to the primary load 3 and smoothing circuit 4. DC power from the smoothing circuit 4 is supplied to the DC/DC converter 5 as well.

Furthermore, upon elapse of the operating time required for closure of the contacts 2-A of the relay (i.e., after the DC power from the smoothing circuit 4 has been stably supplied to the DC/DC converter 5), the microcomputer 5 places the output port OP3 (52) in the control state and, in accordance with the signal inputted to input port IP2 (51), controls the output of the DC/DC regulator 5 so that this output attains a constant voltage. As a result, the control panel 6 and the drive system 7 are provided with power having a constant voltage.

When the output from the DC/DC converter 5 rises, electric power is supplied to the coil 2-B of the relay via the diode 18. Specifically, the coil 2-B of the relay 2 initially receives driving power owing to the charge that has accumulated in the capacitor 19, and thereafter from the output of the DC/DC converter 5. Thus, the closed state of the contacts 2-A of the relay is maintained. As a result, by setting the output voltage of the smoothing unit 9 to be higher than the voltage supplied from the DC/DC converter 5 to the drive system 7, the need to continue driving the relay by the supply power from the transformer 8 can be eliminated. Consequently, the capacity of the transformer 8 need be only enough to supply the driving power of the microcomputer 50. This makes it possible to reduce the capacity of the transformer.

Next, operation will be described for a case in which the operator presses the switch 13 again in order to turn off the apparatus power supply following the performance of various operations by the copying machine.

If the manually operated switch 13 is pressed when all of the power supply circuitry is in the operating state, the contacts of the switch are closed and the input port IP2 (51) to the microcomputer 50 assumes the low level. The microcomputer 50 investigates the state of the input port IP2 (51), senses the port is at the low level and thus is capable of confirming that the switch 13 has been pressed.

When the contacts of the switch 13 open, first the output port OP3 (52) is turned off, the operation of the DC/DC converter 5 is halted and supply of power to the control panel 6 and drive system 7 is terminated. Thereafter, the output port OP2 (55) is turned off, the transistor 20 is turned off and feed of current to the coil 2-B of relay 2 is halted. As a result, the primary load 3 and smoothing circuit 5 also are no longer supplied with electric power, and supply of power to the DC/DC converter 5 also is terminated.

The microcomputer 50 finally turns off the output port OP1 (53), thereby turning off the transistor 14 and the switching transistor 10. Consequently, the supply of power Vcc to the microcomputer 50 also is stopped so that operation of the microcomputer 50 ceases.

Next, the details of operation focusing on power-supply control of the microcomputer 50 will be described with reference to the flowchart of FIG. 2.

When the manually operated switch 13 is pressed, power is supplied to the microcomputer 50, as set forth above. When this done, the microcomputer 50 starts operating from step 71 in FIG. 2. Step 71 is an initialization routine in which various registers incorporated within the microcomputer 50 are initially set and an internal RAM (not shown) is initially cleared.

Next, at step 72, it is determined whether the state of input port IP1 (54) is IP1=0, i.e., whether the manually operated switch 13 is being pressed. Under the present conditions, the manually operated switch 13 is pressed so that the contacts thereof are closed. As a result, the program proceeds from step 72 to step 73, at which the output port OP1 is turned on so that the operating power Vcc continues to be supplied to the microcomputer 50.

Next, at step 74, the output port OP2 (55) is turned on, the coil 2-B of the relay is energized and the contacts 2-A are closed. This is followed by step 75, at which the system waits for a period of time needed for operation of the relay (in this embodiment, the operating time for closure of contacts 2-A is 20 msec). The program proceeds to step 76 following elapse of this period of time.

Next, at step 76, the output port OP3 (52) is placed in the control state to cause the output of the DC/DC converter 5 to rise. It is then again determined at step 77 whether IP1=0 holds. This step is for monitoring whether operation of the switch 13 has ended and the switch 13 is open. When the switch 13 is eventually released, the state IP1=1 is established and the processing of steps 78, 79 is executed.

Step 78 is a copying-machine control routine, the control procedure of which is shown in FIG. 3. This routine is for executing control processing, such as for controlling the display on the control panel 6 and performing a copying operation. Step 79 involves determining whether the state of input port IP1 (54) is "0" or not. In a case were IP1=0 does not hold, the processing of step 78 is continued.

Thus, the operation of the copying machine continues. When operation ends, the user presses the switch 13. When this done, the state of the input port IP1 (54) becomes "1" and the program proceeds from step 79 to step 80. At step S80, the system waits for IP1=1 to be established, i.e., until the switch 13 is released. When operation of the switch 13 ends and IP1=1 is established, the program proceeds to step 81, at which the output port OP3 (52) is turned off and the operation of the DC/DC converter 5 is halted.

Next, the output port OP2 (55) is turned off at step 82 and feed of current to the coil 2-B of relay is terminated to open the contacts 2-A, thereby halting the supply of power to the primary load 3 and smoothing circuit 4. The output port OP1 (53) is then turned off at step S83, as a result of which control is performed so as to turn off the power supply of the microcomputer 50.

Since decay of the power supply takes some time, the microcomputer 50 eventually ceases operating while the processing of steps 71, 72 is being continued.

Thus, the operating power supply of the apparatus in this embodiment can be on/off controlled by the switch 13, which is manipulated by the operator.

The foregoing description relates to operation when the apparatus power supply is on/off controlled manually by the operator. However, the invention is not limited to a case where the power supply is controlled solely by an operation performed by the operator. In the copying-machine control routine (step 78), on/off control of the power supply is performed also when the user has not operated the apparatus for a fixed period of time and when an abnormality develops in the apparatus.

Reference will now be had to FIG. 3 to describe operation when the user has not operated the apparatus for a fixed period of time and when an abnormality develops in the apparatus.

FIG. 3 is a flowchart mainly for describing control of the power supply. This is a flowchart of a program that is included in the copying-machine control routine (step 78) of FIG. 2.

In FIG. 3, it is determined at step 90 whether a copying operation is currently in progress. If the answer is affirmative, processing proceeds to step 91, at which a copy processing routine is executed. By way of example, a static-electric copying sequence is executed. This entails controlling the feeding and conveyance of copy paper, the application of a high voltage to an exposure lamp, etc. Processing proceeds from step 91 to step 96, at which the temperature sensed by the temperature sensor 21 arranged in close proximity to the fixing heater 3a is investigated to determine whether the temperature is abnormal. If the temperature of the fixing heater 3a is less than 220° C., the apparatus is judged to be operating normally and the program returns to step 90.

If it is determined at step 90 that a copying operation is not in progress, then the program proceeds to step 92, at which it is determined whether there is a key input from the control panel 6. If there is a key input, the program proceeds to step 94, at which processing corresponding to the pressed key is executed. Thereafter, at step 95, an operation monitoring time (two minutes in this embodiment) is set in a timer T1 in the microcomputer 50. The operation monitoring time is for cutting off power, with the exception of the operating power to the microcomputer 50, when keys on the control panel have not been operated for a prescribed period of time. After the timer has been set, the program proceeds to step 96.

In a case where there is no input at step 92, the program proceeds from step 92 to step 93, where it is determined whether the timer T1 has run out of time. The program proceeds to step 96 if the timer T1 has not run out of time.

If the timer T1 runs out of time at step 93, i.e., if no key on the control panel 6 is operated for two minutes, which is the operation monitoring time, the program returns to step 81 in FIG. 2. Here processing is executed for cutting off power with the exception of the operating power of the microcomputer 50.

In a case where the temperature of the fixing heater 3a is found to be greater than 220° C. at step 96, it is judged that the fixing unit has developed an abnormality and the program proceeds to step 97, at which the output port OP3 (52) is turned off to halt operation of the DC/DC converter 5. Next, at step 98, the output port OP2 (55) is turned off, the feed of current to the coil 2-b of the relay is terminated, the relay contacts 2-A are opened and the supply of power to the primary load 3 and smoothing circuit 4 is stopped.

The system then waits for a period of time (one hour in this embodiment) required for the fixing unit to cool sufficiently. When this period of time has elapsed and the fixing unit has cooled sufficiently, the program proceeds from step 99 to step 100, at which the output port OP1 (53) is turned off and control is exercised to turn off the power supply of the microcomputer 50.

In accordance with the present embodiment as described above, the following functions can be realized by the arrangement composed of the manually operated switch 13 and the relay:

(1) a mechanism for turning the apparatus power supply on and off;

(2) a function for turning off the power supply automatically when the user has not operated the apparatus for a prescribed period of time; and (3) a function for turning off the power supply automatically when the apparatus has developed an abnormality.

In comparison with the prior-art arrangement, the apparatus can be greatly reduced in size and cost and improved in terms of reliability.

By way of example, since the manually operated switch 13 is disposed in a low-voltage section, an ordinary tactile switch can be used. In addition, the relay itself is much less expensive and higher in reliability than the conventional switch.

Furthermore, in accordance with this embodiment, the relay contacts 2-A are opened after the operation of the DC/DC converter 5 is halted, and therefore the reliability of the contacts is greatly enhanced. Since the arrangement is such that on/off control of the power supplied to the load, which exhibits a large power consumption, is performed by the relay and contacts, reliability is improved and safety is enhanced. Moreover, if a tactile switch is employed as the manually operated switch 13, only a light finger pressure is required to operated the switch. This enhances operability.

<Second Embodiment>

A second embodiment of the present invention will now be described with reference to FIG. 4.

Figure 4:
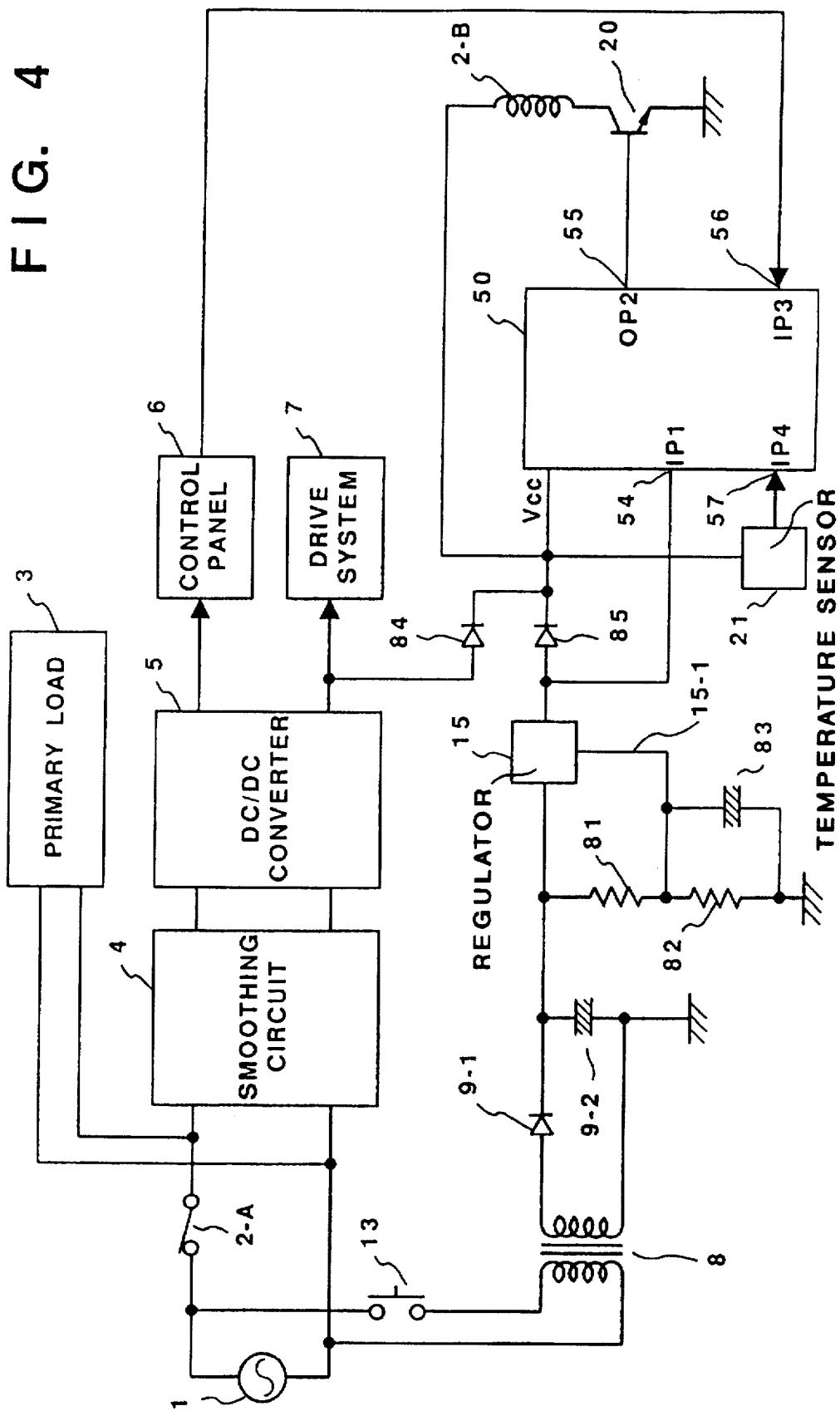
FIG. 4 is a block diagram illustrating a second embodiment of an image processing apparatus according to the present invention.

Components in FIG. 4 that are identical with those shown in FIG. 1 are designated by like reference characters and need not be described in detail again.

In the second embodiment, the transformer 8 is connected to the commercial power supply 11 via the switch 13 operated manually by the user. When the manually operated switch 13 is pressed, therefore, its contacts are closed, the transformer 8 is energized, an output is produced on the secondary side of the transformer, and this output is half-wave rectified by a diode 9-1 and smoothed by a capacitor 9-2.

Numeral 15 denotes a three-terminal regulator having an input-voltage detecting terminal. When the input voltage at an input terminal 15-1 exceeds a predetermined voltage value, the regulator 15 produces an output. The voltage at the input terminal 15-1 of the three-terminal regulator 15 and a delay time for allowing the voltage to rise are set by resistors 81, 82 and a capacitor 83.

The output of the three-terminal regulator 15 is supplied to the power-supply terminal Vcc of the microcomputer 50 via a diode 85 and also to the coil 2-B of the relay and the temperature sensor 21.

Further, the output of the three-terminal regulator 15 is applied to the input port IP1 (54) of the microcomputer 50, which thus is capable of discriminating the state of the three-terminal regulator 15.

The output port OP2 (55) of the microcomputer 50 is connected to the base of the transistor 20. When the microcomputer 50 turns on the output port OP2 (55), the relay coil 2-B is energized to close the relay contacts 2-A.

When the contacts 2-A of the relay are closed, the AC power supply 1 is fed to the smoothing circuit 4 where it is smoothed and then delivered to the DC/DC converter 5. In the second embodiment, direct control of the DC/DC converter 5 by the microcomputer 50 is eliminated. Consequently, upon being supplied with electric power from the smoothing circuit 4, the DC/DC converter 5 immediately produces a stabilized constant-voltage output independently without being externally controlled.

The output of the DC/DC converter 5 is connected to the control panel 6 and drive system 7 to supply these with operating power. At the same time, the output of the DC/DC converter 5 supplies power also to the anode side of a diode 84 so that the driving power Vcc is supplied to the microcomputer 50 via this diode. Consequently, the driving power Vcc will be supplied from the DC/DC converter 5 even when the manually operated switch 13 is subsequently released to halt the supply of power from the three-terminal regulator 15.

The operation of the second embodiment having the foregoing construction will now be described. Since the operation of the second embodiment is substantially similar to that of the first embodiment, the following description will deal mainly with those aspects of operation that are different.

Electric power is not supplied to the transformer 8, primary load 3 and smoothing circuit 4 when the user is not pressing the switch 13.

When the user presses the switch 13 under these conditions, power from the AC power supply 1 is fed to the transformer 8 so that the capacitor 9-2 accumulates electric charge. When the capacitor voltage attains a predetermined value, the three-terminal regulator 15 produces an output (e.g., 5 V DC). As a result, operating power is supplied to the microcomputer 50, which then begins operating.

When the microcomputer 50 is thus activated, it executes operations substantially similar to those of the first embodiment. Specifically, first the output port OP2 is turned on to close the contacts 2-A of the relay. As a result, the AC power supply 1 supplies electric power to the primary load 3 and smoothing circuit 4. In addition, the DC/DC converter 5 produces an output.

When the DC/DC converter 5 produces an output, the control panel 6 and driving system are supplied with operating power, and power is supplied also to the microcomputer 50 via the diode 84. Even when the user releases the manually operated switch 13, therefore, power continues to be supplied to the microcomputer 50.

From this point onward, the apparatus of the second embodiment executes well-known copying processing.

Next, when the user presses the switch 13 again in order to turn off the apparatus power supply, the output of the three-terminal regulator 15 becomes 5 V, in the manner described above. By monitoring the input port IP1 (54), the microcomputer 50 constantly monitors whether there is an input from the switch 13. Owing to the aforementioned depression of switch 13, there is an input from the switch and, hence, the state of the input port IP1 (54) temporarily becomes "1". When the switch 13 is subsequently released, the state of the input port IP1 (54) reverts to "0".

When the state of the input port IP1 (54) becomes "1", the microcomputer 50 turns off output port OP2 (55), thereby turning off the transistor 20. As a result, the feed of current to coil 2-B is cut off and the relay contacts 2-A open. Accordingly, the output from the DC/DC converter 5 vanishes and supply of current to the microcomputer 50 stops, as a result of which the operation of the microcomputer 50 ceases.

The flowchart of FIG. 2 substantially applies also to operation of the microcomputer 50 in this embodiment. In this embodiment, however, steps 73, 75, 76, 81 and 83 should be deleted from the flowchart of FIG. 2 and the logic levels in steps 72, 77, 79 and 80, at which the logic level of the input port IP1 (54) is judged, should be reversed. A further description of the operational flow is omitted for the sake of simplicity and brevity.

The processing at the occurrence of an abnormality, as well as the processing when there is no input from a key for a prescribed period of time, is substantially the same as that described earlier.

Thus, in accordance with the second embodiment described above, power for starting the microcomputer 50 and energizing the relay is supplied by pressing the manually operated switch 13, after which operating power is supplied from the power-supply section comprising the smoothing circuit 4 and the DC/DC converter 5. As a result, the arrangement is simplified. In addition, safety is assured since the transformer 8 also is cut off from the commercial power supply in a state where the aforementioned power has been turned off.

The present invention may be applied to a system composed of a plurality of apparatus or only to a single apparatus. Also, it goes without saying that the invention is applicable also to a case where the invention is achieved by supplying a program to the system or apparatus.

In accordance with the present invention, as described above, the apparatus is reduced in size and cost, the power consumption of the apparatus is reduced, suitable control is performed when an abnormality occurs, reliability is enhanced and operability is improved at the same time.

As many apparently widely different embodiments of the present invention can be made without departing from the spirit and scope thereof, it is to be understood that the invention is not limited to the specific embodiments thereof except as defined in the appended claims.

What is claimed is:

1. A power-supply control apparatus comprising:
   power-supply means for supplying power;
   microcomputer for controlling power supply for a load and for said microcomputer itself;
   first switching means for supplying the power from said power-supply means to said microcomputer in accordance with a manual instruction and for outputting a predetermined signal to said microcomputer in accordance with the manual instruction;
   second switching means, controlled by said microcomputer, for supplying the power from said power-supply means to said microcomputer; and
   third switching means, controlled by said microcomputer, for supplying the power from said power-supply means to the load,
   wherein said microcomputer activates said second and third switching means after said microcomputer has changed its state from which said microcomputer is not supplied with power to which said microcomputer is supplied with the power in response to activation of said first switching means, and said microcomputer deactivates said second and third switching means in response to the output of the predetermined signal from said first switching means while said second switching means is in an activated state.

2. The power-supply control apparatus according to claim 1, wherein said first switching means includes a first transistor provided between said power supply means and said microcomputer and a push-on switch for changing state of said transistor to be conductive, and said second switching means includes said first transistor and a second transistor, controlled by said microcomputer, for making said first transistor conductive.

3. The power-supply control apparatus according to claim 1, wherein said third switching means includes a relay circuit, provided between said power-supply means and the load, and a transistor, controlled by said microcomputer, for making said relay circuit conductive.

4. The power-supply control apparatus according to claim 1, wherein said microcomputer is provided in a copying machine.

5. The power-supply control apparatus according claim 4, further comprising a detecting means for detecting an unusual state of the copying machine,
   wherein said microcomputer deactivates said third switching means in response to a detection of the unusual state by said detecting means.

6. The power supply control apparatus according to claim 4, wherein said microcomputer deactivate said third switching means when it is detected that said copying machine has not been operated by an operator for a predetermined period.

7. The power-supply control apparatus according to claim 1, wherein said microcomputer controls said second and third switching means in accordance with a predetermined program.

8. The power supply control apparatus according to claim 1, wherein said microcomputer includes a terminal for receiving the power supplied from said first and second switching means, and a terminal for receiving the predetermined signal from said first switching means.

9. The power supply control apparatus according to claim 1, wherein said microcomputer deactivates said second switching means after deactivating said third switching means while said second and third switching means are in an activated state.

10. A power-supply control apparatus comprising:

power-supply means for supplying power;

microcomputer for controlling power supply for a load and for said microcomputer itself;

first switching means for supplying the power from said power-supply means to said microcomputer in accordance with a manual instruction and for outputting a predetermined signal to said microcomputer in accordance with the manual instruction; and second switching means, controlled by said microcomputer, for supplying the power from said power-supply means to said microcomputer and the load, wherein said microcomputer activates said second switching means after said microcomputer has changed its state from which said microcomputer is not supplied with power to which said microcomputer is supplied with the power in response to activation of said first switching means, and said microcomputer deactivates said second switching means in response to the output of the predetermined signal from said first switching means while said second switching means is in an activated state.

11. The power-supply control apparatus according to claim 10, wherein said second switching means includes a relay circuit, provided between said power-supply means and the load, and a transistor, controlled by said microcomputer, for making said relay circuit be conductive.

12. The power-supply control apparatus according to claim 10, wherein said microcomputer is provided in a copying machine.

13. The power-supply control apparatus according to claim 12, further comprising a detecting means for detecting an unusual state of the copying machine, wherein said microcomputer deactivates said second switching means in response to a detection of the unusual state by said detecting means.

14. The power-supply control apparatus according to claim 10, wherein said microcomputer controls said second switching means in accordance with a predetermined program.

15. A power-supply control apparatus comprising:

power-supply means for supplying power;

microcomputer for controlling power supply for said microcomputer itself;

first switching means for supplying the power from said power-supply means to said microcomputer in accordance with a manual instruction and for outputting a predetermined signal to said microcomputer in accordance with the manual instruction; and second switching means, controlled by said microcomputer, for supplying the power from said power-supply means to said microcomputer;

wherein said microcomputer activates said second switching means after said microcomputer is changed its state from which said microcomputer is not supplied with power to which said microcomputer is supplied with the power in response to activation of said first switching means, and said microcomputer deactivates said second switching means in response to the output of the predetermined signal from said first switching means while said second switching means is in an activated state.

16. An image processing apparatus which comprises:

a first power-supply section, which is activated automatically in response to operation of a power-supply switch, for supplying operating power to an electronic control circuit which controls operation of the image processing apparatus;

a second power-supply section for supplying operating power to the components other than said electronic control circuit in accordance with control performed by said electronic control circuit;

sensing means capable of sensing the operating state of the power-supply switch, and for informing said electronic control circuit of the operating state; and power-supply control means for activating said second power-supply section when said sensing means senses operation of the power-supply switch at such time that said second power-supply section is in an inactive state, and for deactivating said second power-supply section when said sensing means senses operation of the power-supply switch at such time that said second power-supply section is in an active state.

17. The apparatus according to claim 16, wherein said power-supply switch is closed while being pressed by an operator.

18. The apparatus according to claim 16, wherein said first and second power-supply sections receive a supply of power from a commercial power supply.

19. The apparatus according to claim 18, wherein said first power supply section produces operating power after the commercial power supply is stepped down and smoothed, and said power-supply switch is provided in a low-voltage section obtained by smoothing said first power-supply section.

20. The apparatus according to claim 16, wherein said power-supply control means controls activation and deactivation of said second power-supply section by a switch which closes and opens a power-supply feed line to said second power-supply section.

21. The apparatus according to claim 16, wherein said electronic control circuit is constituted by a microcomputer.

22. The apparatus according to claim 16, further comprising:

abnormality detecting means for detecting an abnormal state in the apparatus; and input means for being used by an operator to input an operation command;

wherein said power-supply control means performs control so as to deactivate said second power-supply section in a case where a command has not been inputted to said input means for a predetermined period of time, a case where said abnormality detecting means has detected an abnormal state in the apparatus, and a case where an input has not been made from said input means for a predetermined period of time, in addition to a case in which said sensing means senses operation of the power-supply switch.

* * * * *

UNITED STATES PATENT AND TRADEMARK OFFICE
CERTIFICATE OF CORRECTION

PATENT NO. : 5,670,832

DATED : September 23, 1997

INVENTOR : Hiroaki Takeda

It is certified that error appears in the above-identified patent and that said Letters Patent is hereby corrected as shown below:

COVER PAGE

Under [56] References Cited, U.S. Patent Documents,
"4,538,007  8/1985  Fraden" should read
--4,538,074  8/1985  Fraden--;

"3,669,412  6/1972  Oawa" should read
--3,669,412  6/1972  Ogawa--.

COLUMN 4

Line 7, "32" should read --3a--.

Signed and Sealed this

Thirtieth Day of June, 1998

Attest:

BRUCE LEHMAN

Attesting Officer

Commissioner of Patents and Trademarks